J. W. TALBOT.
MEANS FOR FORMING COMPRESSED OBJECTS.
APPLICATION FILED JAN. 28, 1918.
1,348,669.
Patented Aug. 3, 1920.
2 SHEETS—SHEET 1.
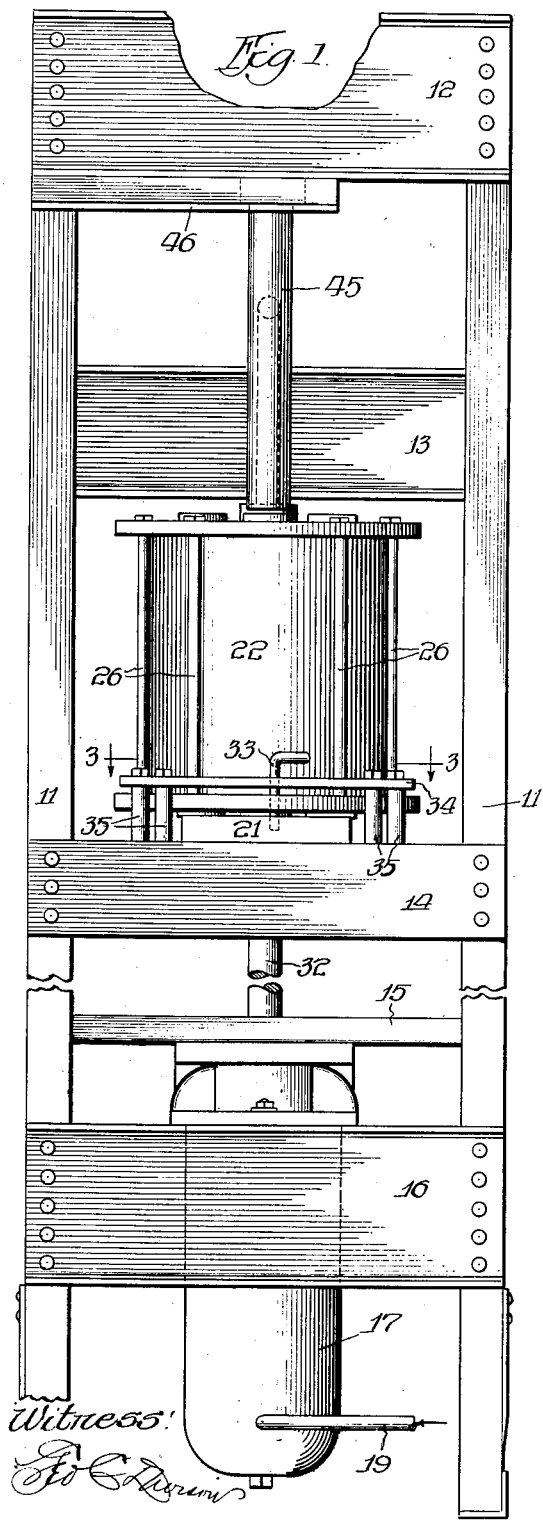
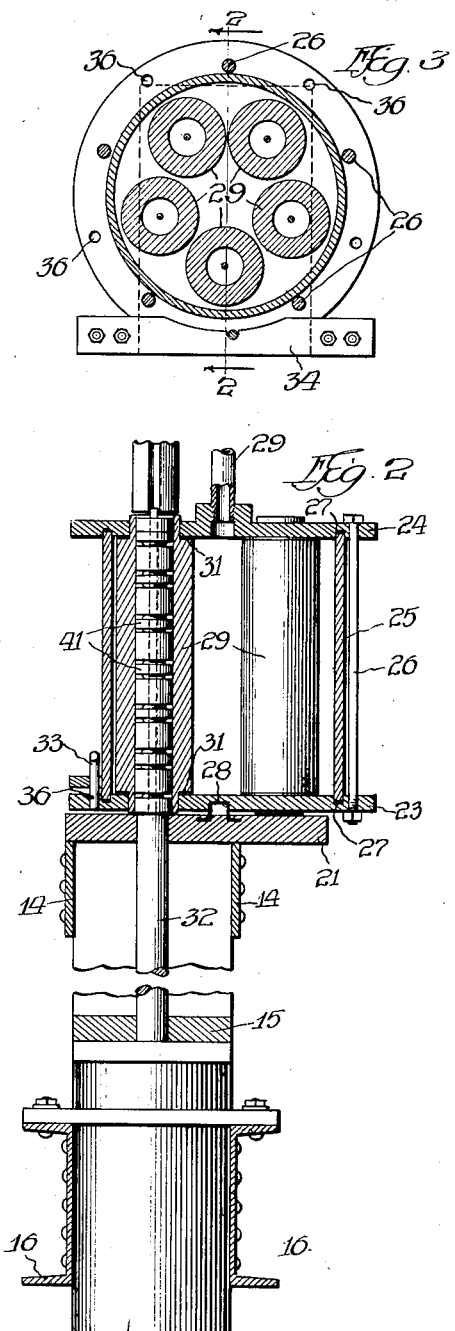
Inventor
John W. Talbot J. W. TALBOT.
MEANS FOR FORMING COMPRESSED OBJECTS.
APPLICATION FILED JAN. 28, 1918.
1,348,669.
Patented Aug. 3, 1920.
2 SHEETS—SHEET 2.
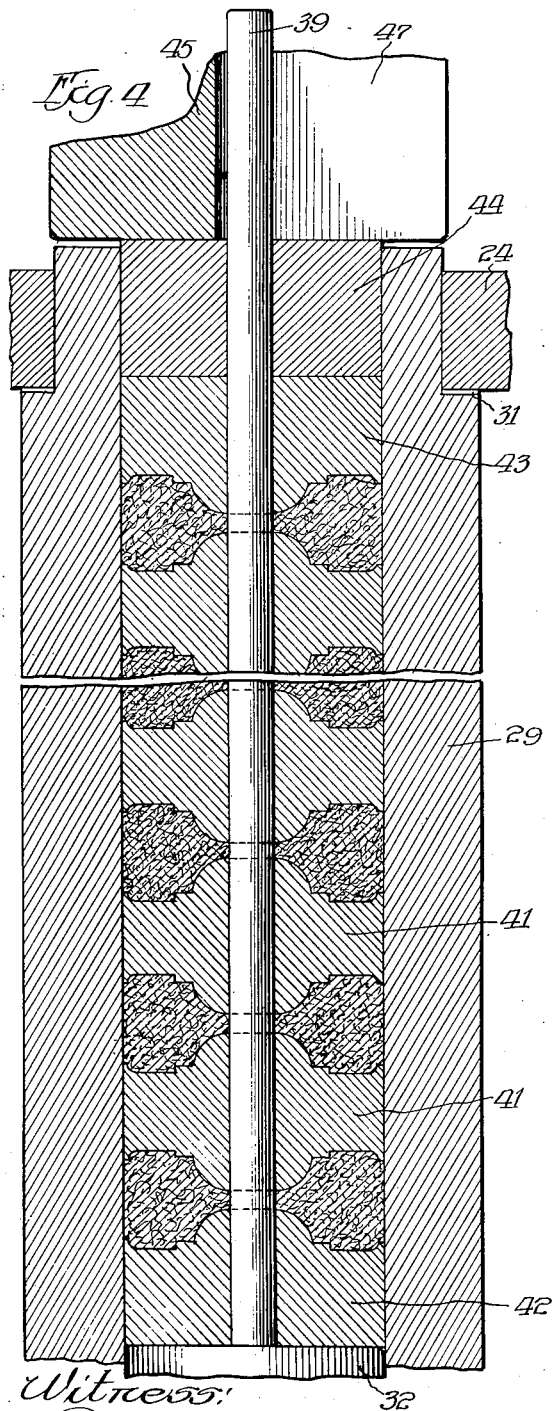
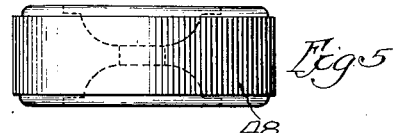
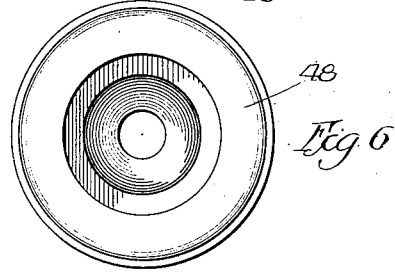
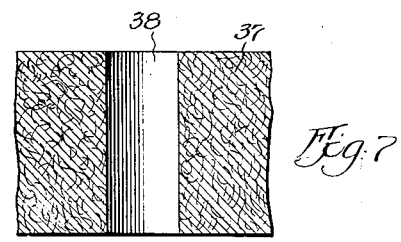
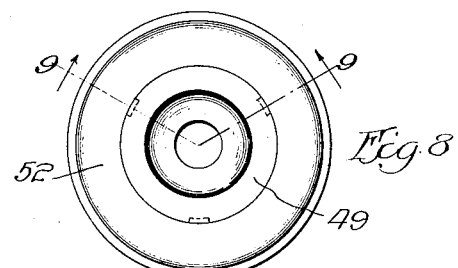
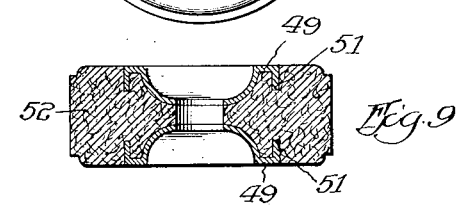

UNITED STATES PATENT OFFICE.

JOHN W. TALBOT, OF CHICAGO, ILLINOIS.

MEANS FOR FORMING COMPRESSED OBJECTS.

1,348,669.  Specification of Letters Patent.  Patented Aug. 3, 1920.

Application filed January 28, 1918. Serial No. 214,153.

*To all whom it may concern:*

Be it known that I, JOHN W. TALBOT, a citizen of the United States, residing at Chicago, in the county of Cook and State of Illinois, have invented certain new and useful Improvements in Means for Forming Compressed Objects, of which the following is a specification.

This invention relates in general to the production of articles or objects which in finished form are highly compressed, and has more particular reference to means by which the compression is effected to give to the articles the required shape and density.

In the manufacture of various composition articles, such as roller skate wheels and the like, it has prior to my invention been customary to press each blank in an individual mold into the required shape, and usually a series of these molds are arranged in a compressing machine so that pressure is simultaneously applied to a plurality of the molds to thus simultaneously produce a plurality of wheels or other articles. Since the pressure applied to each of the molds is the same, it is obvious that unless each mold contains exactly the same amount of material in the blank to be compressed, the density of the compressed articles will vary, that is, the blank which contains the most material before compression will when compressed be of greatest density, while other molds containing blanks embodying less material will be less dense after being compressed, although to the eye all of the articles would appear to be substantially alike. The wearing qualities, however, would differ considerably depending upon the density of the articles. Uniform density of the finished articles is highly desirable, while absolutely uniform thickness is not so important.

One of the primary objects of my present invention is the provision of means whereby a plurality of blanks will be compressed to absolutely uniform density, since my invention contemplates the application of an equal compressing pressure to all of the blanks being operated upon.

Another object of my invention is the provision of a machine by which my improved method may be carried out which will be simple in construction, easy to operate, and efficient and reliable in its operation.

Other objects and many of the attendant advantages of my invention will be readily appreciated as the same becomes better understood by reference to the following description when considered in connection with the accompanying drawings.

Referring to the drawings:—

Figure 1 is a side elevation of a machine embodying my invention and adapted to be utilized in carrying out my improved method;

Fig. 2 is a fragmentary longitudinal sectional view of the machine taken substantially on the line 2—2 of Fig. 3;

Fig. 3 is a transverse sectional view taken substantially on the line 3—3 of Fig. 1;

Fig. 4 is an enlarged vertical sectional view through one of the compression cylinders showing the blanks and forming blocks therein;

Figs. 5 and 6 are edge and face views, respectively, of one of the compressed blanks;

Fig. 7 is a longitudinal sectional view through a blank before it has been compressed;

Fig. 8 is a face view of a completed blank showing the bearing plates applied thereto; and Fig. 9 is a sectional view on the line 9—9 of Fig. 8.

By reference to the drawings, and particularly Fig. 1 thereof, it will be observed that the apparatus by which my method is carried out comprises primarily a strong, vertically disposed and well braced metal frame consisting of uprights 11 rigidly connected together by series of bracing and strengthening members 12, 13, 14, 15 and 16. Rigidly mounted between and securely attached to the members 15 and 16 is a hydraulic cylinder 17 in which a piston (not shown) is adapted to move longitudinally of the cylinder, upward movement of the piston being produced by hydraulic pressure introduced into the lower end of the cylinder through a pipe 19. This hydraulic pressure may be received from any suitable source, and the amount of pressure introduced into the cylinder 17 may be determined by a pressure gage of usual construction (not shown), while the admission of pressure is controlled by the operator by means of a valve (not shown) with which the supply pipe 19 is equipped, the production and control of the hydraulic pressure being similar to that commonly employed in hydraulic presses of various characters.

Between the cross members 13 and 14, and upon a block 21 carried by the members 14, there is rotatably mounted a cylinder designated generally by 22. This cylinder comprises the bottom 23, top 24 and circular side walls 25 rabbeted into the top and bottom plates 24 and 23, these plates being securely clamped together by means of a plurality of clamping rods 26 to form a tight compartment. Packing strips 27 are preferably disposed between the ends of the side walls 25 and the top and bottom plates so as to insure a steam-tight joint. This large cylinder just described is mounted so as to be capable of rotation about a vertical axis on guides or bearings of any preferred construction. In the present instance I have shown the block 21 as provided with an upstanding bearing boss 28 which fits in a corresponding recess in the bottom of the plate 23, thus providing a central bearing about which the cylinder may turn. The upper end of the cylinder is guided by a centrally-disposed pipe threaded into a tapped boss in the top plate 24, and suitably journaled above the cylinder so as to be capable of rotation. This pipe is also connected with a source of steam supply, and is equipped with a controlling valve (not shown).

It will thus be understood that the cylinder 22 provides a steam compartment or jacket. Within this cylinder there is mounted a plurality, in the present instance five, of smaller cylinders 29 each having very thick and strong walls. The lower and upper plates 23 and 24 are provided with openings to receive the reduced lower and upper ends, respectively, of the cylinders 29, as shown in Fig. 2, and packing strips 31 are interposed between the plates and the cylinders on the shoulders to prevent leakage of steam around the ends of the compression cylinders 29. After the parts thus far described are assembled, they are securely locked together by the clamping rods 26 as previously explained.

A heavy piston rod 32 extends upwardly from the piston in the hydraulic cylinder 17 and is adapted to be projected upwardly through a guide opening in the block 21. The cylinder 22 is so mounted that the compression cylinders 29 may be brought successively into alinement with the piston rod 32 as the cylinder 22 is rotated about its axis. In order to insure alinement of the pistons 29 with the piston rod, I have provided a lock which in the present instance consists of a pin 33 mounted in a crossbar 34 and carried by stud bolts 35 upon the main frame of the apparatus, and the lower plate 23 of the cylinder 24 is provided with a series of apertures 36, each disposed opposite one of the cylinders and adapted to receive the lower end of the locking pin 33. When the cylinder 22 is rotated by hand the pin 33 will drop into the opening 36 which is brought beneath it, thereby locking the cylinder against further rotation, and when thus locked a compression cylinder 29 will be alined with the piston rod 32.

In the present instance I contemplate the production of skate wheels, and the blanks from which these wheels are made consist of cylindrical blocks 37, as shown in Fig. 7, formed of suitable composition consisting preferably of a fibrous base thoroughly macerated and mixed with an adhesive and a granular hardener, these blocks having been previously formed and thoroughly dried before being subjected to my present process. These blanks are formed with a central core 38 as shown.

In carrying out my method these blanks are disposed upon a rod or bar 39 in alternation with a series of forming blocks 41 made of hardened steel shaped to loosely fit the cylinders 29, and having their faces formed as counterparts of the shape that it is desired to impart to the blanks. It will be observed from Figs. 2 and 4 that the lower blocks 42 have flat lower faces adapted to rest flatly upon the upper end of the piston rod 32, and that the upper blocks 43 are similarly shaped. A flat-faced compression block 44 is also preferably disposed above the upper block 43 to receive the compression strains imparted to the series of superposed blocks and blanks. All of these blocks and blanks are threaded onto the rod 39 and placed in the compression cylinders, as shown in Fig. 2. When pressure is to be applied from the hydraulic cylinder to the piston rod 32, the upper end of the cylinder 29 is closed so as to prevent a displacement of the blocks and blanks upwardly, but permitting upward movement of the central rod 39. This closure is effected by a thrust or abutment member 45 slidably mounted at its upper end in guideways 46 carried by the main frame so that the member 45 may be moved into and out of alinement with the cylinder 29 as occasion requires. This member 45 is also provided with a radially disposed groove 47 adapted to receive the upwardly projecting rod 39, this groove being provided to permit sliding movement of the member 45 in its guideways into and out of operative position, and the groove being of sufficient length to accommodate and permit upward movement of the rod 39 to the maximum extent required in the compressing operation.

In actual practice a cylinder is loaded with blocks and blanks in the manner described when it is in the position shown in Fig. 2. The cylinder 22 is then moved one step in a clockwise direction viewing Fig. 3. As the cylinders are successively brought over the piston rod 32 the contents are compressed, as will be later described, but starting with the cylinder which has just been loaded it travels in a step-by-step movement in a clockwise direction within the larger cylinder or steam jacket 22 until it comes into operative position over the piston rod 32. Steam is continuously admitted to the cylinder 22 with the result that the compression cylinders 29 are heated, and the blanks therein are consequently heated so as to soften the adhesive in the composition of the blanks. By the time the cylinder reaches operative position the adhesive has been sufficiently softened, and, after the cylinder has been locked in alinement with the load 32, hydraulic pressure is applied to the cylinder 17, thus forcing the rod 32 upwardly in the cylinder 29. The abutment member 45 having previously been moved into alinement with the upper end of the cylinder, the pressure applied to the lower forming block 42 by the piston rod 32 is transmitted through the successive blocks and blanks with the result that the blanks are pressed by the blocks into the shape shown in Fig. 4. The rod 39 during this operation is moved upwardly, its upper end projecting into the groove 47 of the abutment member 45.

It will be obvious that in this operation the pressure exerted by the hydraulically-actuated piston rod 32 is applied equally to all of the blanks with the result that they are compressed to equal density, irrespective of whether all of the blanks contain exactly the same or different amounts of material. The resultant article shown in Figs. 5 and 6, and indicated by reference character 48, is compressed to the desired shape, and is of a desired density which can be determined by the amount of pressure admitted to the hydraulic cylinder 17. After the compressing action has been performed, the hydraulic pressure is relieved, the abutment member 45 is then moved out of alinement with the cylinder, whereupon the rod 39 with the forming blocks and formed blanks thereon may be lifted out of the cylinder. To facilitate this operation the lower block 42 may if desired be fixedly secured to the lower end of the rod 39. A new series of blocks and blanks disposed on another rod are then inserted in the cylinder, or the same blocks and rod may be again used with another series of blanks, whereupon the cylinder is moved around one step in the heating jacket 22, whereupon the compressing operation is performed upon the contents of the next succeeding cylinder, while the cylinder which has just been loaded is being heated. The cylinders are thus successively unloaded and reloaded, and the blanks are heated in their travel in the heating jacket 22 until compressed and removed from the cylinder as previously described.

In order to finally complete the articles, they are again put into the cylinders with bearing plates 49 disposed on each side of each blank, and when pressure is next applied in the manner previously described, which pressure, however, is greater than that exerted in producing the articles shown in Figs. 5 and 6, these bearing plates are rigidly attached to the blanks by forcing the prongs 51 into the body of the material as shown in Fig. 9, and the greater pressure also further compresses the blanks to form the finished skate wheel indicated in Figs. 8 and 9 by reference character 52.

From the foregoing it will be understood that my improved means accurately forms blanks of material into finished articles of the required shape and density, and that the density of all of the articles is equal instead of being variable as it is when a number of articles are formed simultaneously each in an individual mold. By this means I am able to economically and accurately produce composition articles with great speed and accuracy, and while I have illustrated a method of forming skate wheels, it will be obvious that my method and means are adapted for the production of various other articles of the same general character, and that the invention is not limited to the details shown and described for purposes of illustration, but is capable of considerable modification without departing from the spirit of the invention as defined in the following claims.

I claim:

1. In an apparatus of the character described, the combination of a plurality of compression cylinders, a hydraulically-actuated compression device adapted to fit said cylinders, an abutment member movable into and out of alinement with the cylinders when in operative position, and means for supporting said cylinders so that they may be moved successively into operative relation with said compression device and abutment member.

2. In an apparatus of the character described, the combination of a cylindrical jacket, a plurality of compression cylinders arranged within said jacket, a reciprocatory compression device, means for locking said jacket in a plurality of positions to hold any desired cylinder in alinement with said compression device and a movable abutment adapted to be positioned in alinement with said compression device and its coöperative cylinder, by which the contents of said cylinder are retained against expulsion therefrom upon actuation of said compression device.

3. In an apparatus of the character described, the combination of a rotatably mounted closed cylindrical jacket, a plurality of open ended compression cylinders arranged within said jacket, a series of forming blocks adapted to loosely fit within said cylinder and to be disposed in alternate relation in the cylinder with blanks to be compressed, a compression member movable longitudinally of the cylinder to exert pressure on the blocks and blanks disposed therein, means for locking the jacket with a cylinder disposed in alinement with said compression member, and a movably mounted abutment adapted to be moved into and out of alinement with the compression member at the opposite end of said cylinder.

4. In an apparatus of the character described, the combination of a rotatably mounted, closed cylindrical jacket, a plurality of compression cylinders concentrically arranged within said jacket, a hydraulically-actuated compression device adapted to enter the cylinders as they are brought successively into alinement therewith, a core rod, a plurality of forming blocks adapted to be arranged upon said rod in alternate relation with a plurality of blanks to be formed, said blanks, blocks and rod being adapted to be disposed within one of said cylinders, and an abutment member movable into and out of alinement with the cylinder which is alined with said compression device, said abutment member being provided with a longitudinal groove adapted to receive said core rod.

5. In an apparatus of the character described, the combination of a rotatably mounted closed cylinder jacket, a plurality of compression cylinders concentrically arranged therein, a longitudinally movable pressure-exerting device adapted to enter said compression cylinders, means for locking said jacket so as to aline a cylinder with said device, means for removably closing an end of a cylinder which is disposed in alinement with said device, so as to prevent displacement of objects from said cylinder by said device, and means for applying steam to said jacket to heat the cylinders.

JOHN W. TALBOT.